United States Patent [19]
Schievelbein

[11] 4,194,564
[45] Mar. 25, 1980

[54] OIL RECOVERY METHOD

[75] Inventor: Vernon H. Schievelbein, Houston, Tex.

[73] Assignee: Texaco Inc., White Plains, N.Y.

[21] Appl. No.: 950,198

[22] Filed: Oct. 10, 1978

[51] Int. Cl.² ............................................. E21B 43/22
[52] U.S. Cl. ................................................... 166/274
[58] Field of Search ............................... 166/273–275, 166/252; 252/8.55 D

[56] References Cited

U.S. PATENT DOCUMENTS

| | | | |
|---|---|---|---|
| 3,977,471 | 8/1976 | Gale et al. | 166/275 X |
| 4,059,154 | 11/1977 | Braden, Jr. et al. | 166/274 |
| 4,077,471 | 3/1978 | Shupe et al. | 166/275 |
| 4,088,189 | 5/1978 | Shupe | 166/275 X |

*Primary Examiner*—Stephen J. Novosad
*Attorney, Agent, or Firm*—Carl G. Ries; Robert A. Kulason; Gregory A. Cone

[57] ABSTRACT

Oil is recovered from an underground petroleum reservoir which contains a brine having a salinity of from 50 to 220 kg/m³ total dissolved solids by injecting an alkylarylpolyalkoxyalkylene sulfonte surfactant that exhibits phase stability in the brine or diluted brine. The surfactant is injected in an aqueous solution which is prepared with diluted brine which has a salinity slightly less than that required to cause partitioning of the surfactant out of the aqueous phase and to the oil-water interface or oil phase. The injection of surfactant is followed by the injection of a driving slug comprised of either diluted brine or thickened diluted brine.

12 Claims, No Drawings

OIL RECOVERY METHOD

FIELD OF THE INVENTION

This invention relates to an enhanced oil recovery method which utilizes surfactant mixtures prepared to have salinities slightly less than that required to cause redistribution of surfactant from the aqueous phase to the oil-water interface or oil phase. Surfactant mixtures are injected into formations containing brines with higher salinities and are followed by injection of a driving slug of diluted brine with or without polymers. Oil is recovered from production wells.

DESCRIPTION OF THE PRIOR ART

The crude oil which has accumulated in subterranean reservoirs is recovered or produced through one or more wells drilled into the reservoir. Initial production of the crude oil is accomplished by "primary recovery" techniques wherein only the natural forces present in the reservoir are utilized to produce the oil. However upon depletion of these natural forces and the termination of primary recovery, a large portion of the crude oil remains trapped within the reservoir. Also many reservoirs lack sufficient natural forces to be produced by primary methods from the very beginning. Recognition of these facts has led to the development and use of many enhanced oil recovery techniques. Most of these techniques involve injection of at least one fluid into the reservoir to product an additional amount of the crude oil therefrom. Some of the more common methods are water flooding, steam flooding, miscible flooding, $CO_2$ flooding, polymer, flooding, surfactant flooding, caustic flooding and in situ combustion.

Water flooding, which involves injection of water into the subterranean oil reservoir for the purpose of displacing the crude oil from the pore spaces of the reservoir rock towards the producing wells is the most economical and widely used of the enhanced oil recovery methods. Nevertheless water does not displace oil with high efficiency because of the immiscibility of water and oil and because of the high interfacial tension between them.

Surfactant flooding involves the addition of one or more surface active agents, or surfactants, to the water flood for the purpose of minimizing the water flooding problems mentioned above. This has been an area of active interest in the art of enhanced oil recovery methods for many years. For example in 1941, U.S. Pat. No. 2,233,381 disclosed the use of polyglycol ether as a surfactant which increases the capillary displacement efficiency of an aqueous flood. U.S. Pat. No. 3,302,713 discloses the use of petroleum sulfonates as effective surfactants in oil recovery operations. Other surfactants proposed for use in oil recovery processes include alkylpyridinium salts, alkyl sulfates, alkylaryl sulfates, ethoxylated alkyl or alkylaryl sulfates, alkyl sulfonates, alkylaryl sulfonates and quaternary ammonium salts.

While the above surfactants may be effective under ideal conditions, there are problems concerned with the use of each in most petroleum reservoirs. Some of the most serious problems arise from the effects of reservoir fluid salinity on the injected surfactant, the most common being precipitation and resultant loss of the surfactant. Under such conditions, the art contains proposals to mix various different types of surfactants, such as anionic and nonionic, to achieve a higher salinity tolerance for the mixture. However, even this is not entirely satisfactory because as the mixture is driven through the formation, one of the components is often preferentially adsorbed to the mineral grains in the formation matrices, causing a change in the relative concentration of the surfactant components and resulting in a failure to maintain effective salinity tolerance.

Another serious problem concerns the vertical conformance efficiency of a surfactant flooding operation. Most reservoirs display significant permeability variations throughout their volumes causing fluids to flow preferentially through the high permeability sections, leaving portions of the reservoir with lower permeabilities essentially isolated from the effects of the injected fluids. The solution to this problem is throught to lie in selectively plugging the higher permeability streaks in order that the injected fluids be then forced into the previously unswept lower permeability portions of the reservoir. Several solutions to this problem have been proposed, but none have proved to be entirely successful. It is felt that most of these proposed solutions only affect a region relatively close to the injection well bore. The most effective process would appear to be a technique that is continuous with the entirety of the surfactant injection cycle and would contact all but the very lowest permeability elements of the total reservoir volume.

It can be readily seen that there remains a substantial need for a surfactant flooding process that will perform effectively in a high salinity reservoir environment while displaying a high vertical conformance efficiency.

SUMMARY OF THE INVENTION

This invention involves an enhanced oil recovery process useful in reservoirs containing fluids having a salinity ranging from 50 to 220 kg/m$^3$ dissolved solids. The process includes mixing an alkylarylpolyalkoxyalkylene sulfonate with a brine and sufficient fresh water to produce a mixture that is slightly below the salinity level at which the surfactant will partition out of the aqueous phase and to the oil-water interface or the oil phase. The injected surfactant mixture is followed by a driving slug of thickened diluted brine or diluted brine.

DESCRIPTION OF THE PREFERRED EMBODIMENTS

The method of this invention is employed in high salinity petroleum reservoirs having from 50 to 220 kg/m$^3$ dissolved solids. The surfactant mixture as injected is designed to partition into the oil phase of reservoir fluid mixture upon contact with the high salinity reservoir fluids and then partition back into the aqueous phase when contacted with increasing amounts of the lower salinity fluids of the continuing surfactant flood and the following polymer flood. The utilization of this salinity gradient technique has been demonstrated to recover very substantial amounts of oil not recoverable by water flooding alone and to provide an effective measure of vertical conformance control in very high salinity environments.

It is anticipated that this process would find its most frequent use in reservoirs that have already been water flooded with high salinity brines. Nevertheless, the process would also be effective in reservoirs containing high salinity natural brines that have not been water flooded.

First, a suitable alkylarylpolyalkoxyalkylene sulfonate is selected by testing it for stability. This is done by mixing the surfactant and, optionally, a small amount of crude oil or a distilled fraction thereof with the high salinity reservoir brine or the brine diluted with fresh water. A suitable surfactant will not precipitate or separate as a surfactant-rich layer from the brine.

Tests are then run to optimize the salinity for the surfactant solution. Partitioning data have been found to be particularly useful in this respect, with the most desirable surfactant solution salinity being at a level slightly lower than the salinity at which approximately one-half of the surfactant partitions from the aqueous phase into oil and emulsion phases. The surfactant solution is then made up comprising the surfactant, brine, and fresh water and, optionally, additives such as sacrificial agents and polymers. This solution is then injected into the petroleum reservoir. The surfactant slug is followed by a driving slug comprising either a brine or a brinepolymer solution of approximately the same salinity as the surfactant slug. The petroleum is then recovered from production wells in the reservoir.

The concentration of the surfactant as used in the process of this invention will vary generally depending on the particular surfactant chosen for use, as well as the water salinity and hardness. It is highly preferred that the optimum response at various concentrations be measured under conditions simulating those which will be present in the reservoir, and the concentration corresponding to the optimum surfactant performance characteristic be identified in this manner. Generally the concentration of the alkylarylpolyalkoxyalkylene sulfonate will be from about 0.05 to about 10.0 percent by weight and preferably from about 0.1 to about 5.0 percent by weight.

The volume of the surfactant slug can vary from about 2 to about 75 pore volume percent, and is preferably from about 10 to about 50 pore volume percent. It is anticipated that the injected volume of surfactant solution would be optimized at the most economically efficient level.

The surfactant solution may be displaced through the formation by injecting brine, or it may be followed immediately, by a quantity of thickened water such as formed by mixing a small amount of a hydrophilic polymer such as polyacrylamide or polysaccharide in brine. In either case, the displacing fluid should have a salinity at a level where the surfactant repartitions from the oil-water interface or oil phase to the aqueous phase. Generally from about 5 to about 50 pore volume percent of an aqueous solution containing from about 0.01 to about 1.0 percent by weight of hydrophilic polymer is used. This would normally be followed by water injection until the water-oil ratio of the produced fluid increases to the point where further water injection is uneconomical.

The following is proposed as an explanation for the success of the method of this invention in recovering petroleum from high salinity reservoir environments. As the surfactant solution is injected, it mixes with the higher salinity reservoir brine. The surfactant is then forced by this higher salinity to the oil-water interface or into the oil phase where the surfactant can more efficiently participate in the oil recovery process. The surfactant is then either displaced with the moving brine and oil or remains stationary as an immobile oil or emulsion phase. Low salinity brine, in both the surfactant and polymer slugs, continues to be injected however, and the immobile fluids are subjected to ever decreasing salinity. Ultimately, the salinity will decrease to the point where the surfactant can partition back into the aqueous phase. The surfactant is then displaced further into the reservoir where it will again encounter the higher salinity brine, and the process will repeat itself and recover additional oil. Pressure measurements during injection of the surfactant solution also indicate that the emulsions which are formed plug the higher permeability channels in the reservoir medium and so act to increase the sweep efficiency of the process.

The salinity gradient process disclosed herein should be distinguished from other salinity gradient techniques known in the art. These known processes invariably employ a salinity gradient between the surfactant slug and the driving fluid whereas the instant invention utilizes the salinity gradient between the formation fluids and the injected surfactant slug.

Reference is now made to the following examples which will serve to illustrate the invention more fully. The invention should, however, not be deemed as limited to these examples.

EXAMPLE I

An alkylaryl polyethoxy alkylenesulfonate of the formula:

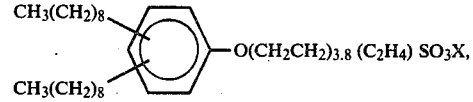

where X is a cation, was prepared in the laboratory. This surfactant, hereinafter surfactant A, demonstrated phase stability when mixed with an oil field brine and the diluted oil field brine. This reservoir brine has a salinity of about 85 kg/m$^3$ total dissolved solids (TDS). Partitioning data was obtained by mixing 25 cm$^3$ of 10 kg/m$^3$ solutions of surfactant A at different salinity levels with 5 cm$_3$ of field crude oil in a 43° C. wheel oven for several days, allowing gravity segregation for 3 days and finally determining the concentration of surfactant A, $C_f$, remaining in the aqueous phase. This value, $C_f$, is compared to the initial concentration, $C_i$, and is reported in Table I. The values show that at salinities greater than 28 kg/m$^3$ most of the surfactant partitions into oil or emulsion phases. Consequently, a salinity level of 28 kg/m$^3$ was utilized for the core flood tests.

TABLE I

| SURFACTANT PARTITIONING v. SALINITY | |
|---|---|
| Salinity, kg/m$^3$ | Surfactant Partitioning, $C_f/C_i$ |
| 85 | 0.01 |
| 75 | 0.01 |
| 66 | 0.09 |
| 57 | 0.01 |
| 47 | 0.04 |
| 37 | 0.06 |
| 28 | 0.90 |

Berea cores, 5.08 cm in diameter and 15–23 cm in length, were cleaned by successive water, isopropyl alcohol, toluene, isopropyl alcohol and water throughputs. The cores were then dried and saturated with oilfield brine and crude oil thinned with 0.25 m$^3$/m$^3$ heptane to match reservoir viscosity. The cores were then water flooded to irreducible water flood oil saturation with the oil field brine.

The surfactant solutions were prepared in brine-fresh water mixtures with an active concentration of surfactant A of 6 kg/m$^3$. The salinity of the solution was 28 kg/m$^3$ TDS and the slug size was 0.5 m$^3$/m$^3$ pore volumes (Vp). The surfactant solution slug was driven by a polymerbrine solution composed of an aqueous solution of 1000 g/m$^3$ Xanflood, a commercially available polysaccharide polymer, at the same salinity as the surfactant solution. Marasperse 92Z, a commercially available chemically modified lignosulfonate, was added to the surfactant solution as a sacrificial agent. The displacement rates were 0.5, 0.1 and 0.5 cm$^3$/min. respectively, for the three tests. The results of the core floods are reported in Table II in terms of the percent additional oil recovered by the surfactant flood, $E_R$, and the final irreducible oil saturation at the end of the test, $S_{of}$.

TABLE II

| Test No. | $E_R$, m$^3$/m$^3$ | $S_{of}$, m$^3$/m$^3$ | MARASPERSE 92Z kg/m$^3$ |
|---|---|---|---|
| 1 | 0.61 | 0.11 | 15 |
| 2 | 0.58 | 0.11 | 15 |
| 3 | 0.54 | 0.12 | 7.5 |

These results demonstrate that the method of this invention can achieve oil recoveries of about 60% under realistic and quite hostile reservoir salinity conditions.

EXAMPLE 2

Two cores were tested to demonstrate the effect of the salinity gradient on the oil recovery efficiency of the process of this invention. The experimental procedure was identical to Example 1 except that the brine used to initially saturate the cores and to water flood prior to surfactant injection was 28 kg/m$^3$ TDS in Run No. 1 and 85 kg/m$^3$ TDS in Run No. 2 and the flow rates were 0.5 cm$^3$/min. Run No. 2 duplicates the conditions of Example 1. The results are reported in Table III.

TABLE III

| Run. No. | $E_R$, m$^3$/m$^3$ | $S_{of}$ |
|---|---|---|
| 1 | 0.13 | 0.24 |
| 2 | 0.60 | 0.11 |

This example demonstrates the importance of incorporating a salinity gradient into the process of this invention.

EXAMPLE 3

These tests utilized an alkylaryl polyethoxy alkylene sulfonate of the formula:

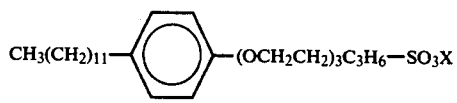

where X is a cation, as the surfactant for the method of this invention. This surfactant, hereinafter surfactant B, exhibited phase stability with diluted oil field brine and was subjected to partitioning tests performed in the same manner as those preported in Example 1. These results are reported in Table IV and indicate that a salinity of about 65 kg/m$^3$ total dissolved solids (TDS) would satisfy the salinity concentration criterion.

TABLE IV

| Salinity kg/m$^3$ TDS | SYSTEM X[1] $C_f/C_i$ | SYSTEM Y[2] $C_f/C_i$ |
|---|---|---|
| 82 | 0.03 | 0.07 |
| 75 | | 0.10 |
| 69 | 0.06 | |
| 66 | | 0.29 |
| 57 | 0.67 | |
| 50 | | 0.62 |
| 45 | 0.82 | |
| 41 | | 0.71 |
| 37 | 0.82 | |
| 33 | | 0.88 |
| 25 | | 0.93 |
| 20 | 1.00 | |

[1] $C_i$ = 10 kg/m$^3$ Surfactant B
[2] $C_i$ = 6 kg/m$^3$ Surfactant B

Core flooding tests were then conducted in 5.08 cm diameter by 16–18 cm long Berea cores. The cores were cleaned and prepared by successive water, isopropyl alcohol, toluene, isopropyl alcohol and water throughputs followed by drying. The cores were then saturated with oilfield brine and crude oil thinned with 0.25 m$^3$/m$^3$ heptane to match reservoir viscosity. The final preparatory step comprised water flooding the core with 85 kg/m$^3$ TDS brine until an irreducible oil saturation was reached.

A surfactant solution comprising a 0.5 Vp slug of Surfactant B mixed with diluted brine at 42.5 kg/m$^3$ TDS salinity was then injected. The polymer slug which followed was a mixture of the same diluted brine with a concentration of 1000 gm/m$^3$ Xanflood polymer. A sacrificial agent, Marasperse 92 Z was added to the surfactant slug in runs 2, 3 and 4 in concentrations of 15.0, 7.5 and 7.5 kg/m$^3$ respectively. Injection rates were 0.5 ml/min for runs 1, 2 and 3 and 0.1 ml/min in run No. 4. Results of these runs are reported in Table II.

TABLE V

| Run No. | Surfactant Concentration Kg/m$^3$ | $E_r$, m$^3$/m$^3$ | $S_{of}$ m$^3$/m$^3$ |
|---|---|---|---|
| 1 | 10.0 | 0.58 | 0.12 |
| 2 | 10.0 | 0.51 | 0.16 |
| 3 | 6.0 | 0.48 | 0.15 |
| 4 | 6.0 | 0.69 | 0.10 |

From these results it can again be seen that the method of this invention produces excellent results, averaging about 57% in additional oil recovery beyond that attainable by water flooding alone.

EXAMPLE 4

These tests employed solutions of Surfactant B. The tests were conducted in 17.4 cm long Silurian cores with a 0.3 m/day displacement rate. The cores were initially saturated with oilfield brine and crude oil thinned with 0.25 m$^3$/m$^3$ heptane. After water flooding to completion with 85 kg/m$^3$ TDS brine, the cores were flooded with 0.3 Vp of 10 kg/m$^3$ solutions of surfactant B and were followed by 1000 ppm Xanflood polymerbrine solutions. The surfactant and polymer solutions were prepared in several different salinity level solutions. The results are reported in Table VI.

TABLE VI

| Run No. | Salinity, Kg/m³TDS Surfactant B | Salinity, Kg/m³TDS Polymer | $E_R$, m³/m³ | $S_o$ m³/m³ |
|---|---|---|---|---|
| 1 | 72 | 77 | 0.53 | 0.19 |
| 2 | 64 | 64 | 0.61 | 0.23 |
| 3 | 64 | 64 | 0.65 | 0.23 |
| 4 | 64 | 43 | 0.59 | 0.22 |
| 5 | 43 | 43 | 0.60 | 0.20 |

Again, excellent oil recovery is demonstrated, averaging about 60% additional oil recovered.

EXAMPLE 5

These tests also employed solutions of Surfactant B in 5.08 cm diameter by 16–18 cm long Berea sandstone cores; the surfactant was injected continuously. The brines used to saturate and water flood the cores were 85 kg/m³ in Run No. 6 and 42.5 kg/m³ in Run No. 7. The injection rates were maintained at 0.5 cm³/min. and injection pressure was monitored. Surfactant B solutions were prepared in 85 and 42.5 kg/m³ brine in Runs No. 6 and 7 respectively. The results showed a 10 fold pressure increase during surfactant injection in Run No. 6 and a small pressure decline during surfactant injection in Run No. 7.

Since these tests were conducted by continuous injection of the surfactant solution, the pressure data obtained indicate the conditions which occur in a particular region of the injected surfactant slug rather than the end results of the use of the complete sequence of injection phases in a normal core flood.

The high pressures which occurred at the 85 Kg/m³ salinity levels show the conditions which exist at the leading edge of the surfactant slug as the surfactant begins to form emulsions upon contact with the high salinity formation water which in turn points to an increased surfactant sweep efficiency as surfactant fluid is forced into areas of the reservoir rock matrix which were not previously penetrated by the surfactant. The lack of pressure build up at the 42.5 Kg/m³ salinity levels indicates that permeability has not been reduced under the conditions which exist behind the leading edge of the surfactant slug where the lower salinity of the driving agent and the surfactant slug predominate. This absence of permeability reduction at the lower salinity level also indicates surfactant slug is able to be displaced by the driving slug with good efficiency due to the lack of pressure build up.

I claim:

1. A process for recovering petroleum from an underground reservoir wherein the reservoir is penetrated by at least one injection well and at least one production well, said wells being in fluid communication with each other, and wherein the reservoir contains a brine with from 50 to 220 kg/m³ salinity comprising:
   (a) preparing a surfactant solution wherein the surfactant is an alkylaryl polyethoxy alkylene sulfonate of the formula:

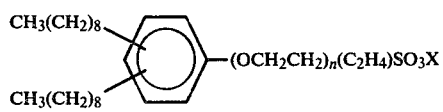

wherein n is a number from 2 to 8 and X is a cation, which exhibits phase stability when mixed with small amounts of crude oil or distilled fractions thereof and a brine, said surfactant solution comprising from about 0.05 to 10.0 percent by weight surfactant and a brine or diluted brine having a salinity slightly less than the salinity required to produce partitioning of about one half of the surfactant solution out of the aqueous phase and into oil and emulsion phases;
   (b) injecting the surfactant solution through the injection means into the underground reservoir;
   (c) injecting a driving agent; and
   (d) recovering petroleum from the production means.

2. The process of claim 1 wherein the surfactant solution further comprises an effective amount of a sacrificial agent.

3. The process of claim 1 wherein the surfactant solution further comprises a minimal amount of crude oil or distilled fractions thereof sufficient to stabilize the solution.

4. The process of claim 1 wherein the surfactant solution further comprises an amount of a hydrophilic polymer sufficient to raise the viscosity of the surfactant solution to an effective level.

5. The process of claim 1 wherein the driving agent has approximately the same salinity as the surfactant solution.

6. The process of claim 1 wherein the driving agent comprises brine and an amount of hydrophilic polymer sufficient to raise the viscosity of the driving agent to an effective level.

7. A process for recovering petroleum from an underground reservoir wherein the reservoir is penetrated by at least one injection well and at least one production well, said wells being in fluid communication with each other, and wherein the reservoir contains a brine with from 50 to 220 kg/m³ salinity comprising:
   (a) preparing a surfactant solution wherein the surfactant is an alkylarylpolyalkloxyalkylene sulfonate of the formula:

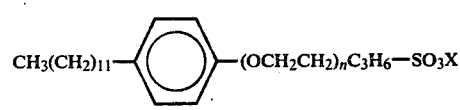

where n is a number from 2 to 8 and X is a cation, which exhibits phase stability when mixed with small amounts of crude oil or distilled fractions thereof and a brine, said surfactant solution comprising from about 0.05 to 10.0 percent by weight surfactant and a brine or diluted brine having a salinity slightly less than the salinity required to produce partitioning of about one half of the surfactant solution out of the aqueous phase and into oil and emulsion phases;
   (b) injecting the surfactant solution through the injection means into the underground reservoir;
   (c) injecting a driving agent; and
   (d) recovering petroleum from the production means.

8. The process of claim 7 wherein the surfactant solution further comprises an effective amount of a sacrificial agent.

9. The process of claim 7 wherein the surfactant solution further comprises a minimal amount of crude oil or distilled fractions thereof sufficient to stabilize the solution.

10. The process of claim 7 wherein the surfactant solution further comprises an amount of a hydrophilic polymer sufficient to raise the viscosity of the surfactant solution to an effective level.

11. The process of claim 7 wherein the driving agent has approximately the same salinity as the surfactant solution.

12. The process of claim 7 wherein the driving agent comprises bring and an amount of a hydrophilic polymer sufficient to raise the viscosity of the driving agent to an effective level.

* * * * *